US010245454B2

(12) United States Patent
Barbeau et al.

(10) Patent No.: US 10,245,454 B2
(45) Date of Patent: Apr. 2, 2019

(54) FIREFIGHTER PROTECTIVE GARMENT HAVING A THERMAL BARRIER WITH SPACERS TO INCREASE DISSIPATION OF METABOLIC HEAT

(71) Applicant: INNOTEX INC., Richmond (CA)

(72) Inventors: Claude Barbeau, St-Bruno (CA); Eric St-Arneault, Sherbrooke (CA); Maxime Bigonnesse, Asbestos (CA)

(73) Assignee: INNOTEX INC., Richmond (CA)

(*) Notice: Subject to any disclaimer, the term of this patent is extended or adjusted under 35 U.S.C. 154(b) by 8 days.

(21) Appl. No.: 15/343,418

(22) Filed: Nov. 4, 2016

(65) Prior Publication Data

US 2017/0120082 A1 May 4, 2017

Related U.S. Application Data

(60) Provisional application No. 62/250,683, filed on Nov. 4, 2015.

(51) Int. Cl.
*D03D 15/12* (2006.01)
*A41D 31/02* (2006.01)
(Continued)

(52) U.S. Cl.
CPC ........ *A62B 17/005* (2013.01); *A41D 13/0056* (2013.01); *A41D 27/04* (2013.01);
(Continued)

(58) Field of Classification Search
CPC .. A41D 31/0027; A41D 31/005; A41D 13/00; A41D 19/01523; A41D 2400/22;
(Continued)

(56) References Cited

U.S. PATENT DOCUMENTS 5,001,783 A * 3/1991 Grilliot .............. A41D 31/0027 2/69
5,131,097 A * 7/1992 Grilliot .............. A41D 31/0027 2/69
(Continued)

FOREIGN PATENT DOCUMENTS

DE 202007004756 U1 5/2007
DE 202012009213 U1 1/2013
(Continued)

OTHER PUBLICATIONS

European Search Report for Application No. 16197374.8, dated Mar. 2, 2017, 10 pages.

*Primary Examiner* — Robert H Muromoto, Jr.
(74) *Attorney, Agent, or Firm* — Dilworth IP, LLC

(57) ABSTRACT

A firefighter's protective garment including an outer shell, moisture barrier and thermal barrier in which the thermal barrier is constructed with spacers on its inner surface such that air can circulate between the garment and the firefighter wearing it. The garment redistributes metabolic heat over a larger surface area, and increases metabolic cooling and firefighter comfort. In the preferred embodiment of the invention, the spacers are strategically attached to those areas of the thermal barrier which find themselves opposite those parts of the human body having the highest rates of perspiration and metabolic heat transfer.

65 Claims, 8 Drawing Sheets

(51) Int. Cl.

| | |
|---|---|
| ***A41D 31/00*** | (2006.01) |
| ***A62B 17/00*** | (2006.01) |
| ***A41D 27/04*** | (2006.01) |
| ***A41F 19/00*** | (2006.01) |
| ***A41D 13/005*** | (2006.01) |

(52) U.S. Cl.
CPC ..... *A41D 31/0022* (2013.01); *A41D 31/0027* (2013.01); *A41F 19/00* (2013.01); *A62B 17/003* (2013.01); *A41D 2400/20* (2013.01); *A41D 2400/60* (2013.01)

(58) Field of Classification Search
CPC .. A41D 31/0022; A62B 17/003; D03D 15/00; D03D 15/12
See application file for complete search history.

(56) References Cited

U.S. PATENT DOCUMENTS

| | | | | |
|---|---|---|---|---|
| 5,274,849 A * | 1/1994 | Grilliot | .............. A41D 31/0027 | 2/69 |
| 5,299,602 A * | 4/1994 | Barbeau | ............. A41D 31/0022 | 139/420 A |
| 5,896,583 A * | 4/1999 | Grilliot | .................. A41D 13/00 | 2/23 |
| 2002/0107315 A1* | 8/2002 | Chaudhary | .......... C08K 5/0066 | 524/371 |
| 2006/0199456 A1* | 9/2006 | Taylor | ................ A41D 13/0156 | 442/224 |
| 2008/0113143 A1* | 5/2008 | Taylor | .................. A41D 31/005 | 428/47 |
| 2008/0263738 A1* | 10/2008 | Shamis | ............ A41D 19/01523 | 2/16 |

FOREIGN PATENT DOCUMENTS

| | | | |
|---|---|---|---|
| WO | 199205717 | A1 | 4/1992 |
| WO | 2012116377 | A2 | 8/2012 |

* cited by examiner

FIREFIGHTER PROTECTIVE GARMENT HAVING A THERMAL BARRIER WITH SPACERS TO INCREASE DISSIPATION OF METABOLIC HEAT

FIELD OF THE INVENTION

This invention generally relates to the design and construction of a thermal barrier in a firefighter's protective garment. More particularly, the present invention is concerned with the placement of spacers on the side of the thermal barrier closest to the body of the firefighter so as to enhance air circulation between the firefighter protective garment and the body of the firefighter.

BACKGROUND OF THE INVENTION

A firefighter protective garment is usually a coat or a pant consisting of three or more functional layers of fire-resistant materials. The various layers are normally but not limited to the following:

- the outer shell which provides protection against puncture, cuts, abrasion, and heat;
- the moisture barrier—consisting usually of a woven or non-woven substrate to which a fire resistant semi-permeable polymer is coated or laminated—which provides resistance to penetration by liquids and blood-borne pathogens while facilitating the transmission of metabolic heat away from the body of the firefighter.
- the thermal barrier—usually consisting of an insulating layer of batting or non-woven fabric quilted or laminated to a woven face cloth—which provides the bulk of the resistance to the transmission of heat from the external environment to the body of the firefighter.

A person being involved in the activities of a firefighter generates metabolic heat that must be dissipated if the person is to maintain healthy bodily function. The principal means by which the clothed firefighter body dissipates metabolic heat is by perspiring. The greatest rate of metabolic heat transfer through perspiration occurs via the mechanism of evaporative cooling and is higher the closer the evaporating perspiration is to the human body. The second mechanism of metabolic heat transfer is evacuation of sensible heat, that is, liquid perspiration contains heat and as that liquid perspiration moves away from the body—through wicking, dripping, etc.—the heat load it contains is also removed from the body. However, evaporation of a given quantity of perspiration evacuates many times more metabolic heat than does the transport of the same quantity of liquid perspiration.

A common configuration and orientation of these layers in a firefighter garment is as follows:

The outermost layer is the outer shell fabric. Moving inwards, the next functional layer is the moisture barrier, orientated with the substrate towards the outer shell and the semi-permeable polymer membrane towards the inside. The next functional layer is the thermal barrier, orientated with the thicker and softer insulating layer facing the moisture barrier film and the face cloth towards the body of the firefighter.

In most common configurations, the thermal barrier is, for the most part and more particularly when wearing a self-contained breathing apparatus (SCBA), in close contact with either the firefighter's clothing or his/her skin. A significant proportion of the firefighter's perspiration cannot therefore, readily evaporate from his/her skin or clothing, but instead must be absorbed by, or wick through, the thermal barrier to effect cooling via the removal of the sensible heat of the liquid perspiration.

Any firefighter garment, including its thermal barrier, must pass stringent performance requirements of NFPA 1971 if the garment is to be certified compliant with this standard and judged suitable for its intended use. Two critical tests in evaluating the protection and comfort of a firefighter protective garment are the Thermal Protective Performance (TPP) test and the Total Heat Loss (THL) test.

The TPP test assesses the ability of the composite structure of a firefighter garment to delay the transfer of radiant and convective heat from the external environment to body of the firefighter and the NFPA 1971 standard mandates a minimum performance standard of 35 (equal to a heat flux of 2 cal/cm$^2$/sec×a minimum elapsed time of 17.5 seconds until the sensor records the equivalent of a 2$^{nd}$ degree burn).

The THL test simulates the transfer of metabolic heat through the composite structure of the firefighter garment from the body of the firefighter to his external environment via the mechanisms of conduction and evaporation. The NFPA 1971 standard mandates a minimum performance rating of 205 W/m$^2$.

TPP performance is, for the most part, inversely proportional to THL performance and a selection and construction of the composite structure of a firefighter garment that increases one will invariably decrease the other.

As currently written, the NFPA 1971 TPP and THL test procedures specify testing of only the composite structure comprising the three component layers of the garment and do not provide for the inclusion of added elements in the test sample.

U.S. Pat. No. 5,001,783A discloses a firefighter garment wherein a spacer element or elements are positioned between two of the layers of the garment. The object of this invention is to incorporate dead-air space in the garment in order to increase the thermal insulating properties thereof. However, by positioning the spacer(s) between two layers of the garment the face cloth fabric of the thermal barrier in direct contact with the uniform or the skin of the firefighter and hence does not provide for a cooling flow of air between the innermost layer of the firefighter protective garment and its wearer. Because the NFPA 1971 TPP and THL test procedures specify testing of only the three component layers of the garment and do not provide for the inclusion of added elements in the test sample it is not obvious that the invention would be able to meet the TPP requirements of the NFPA 1971 standard. Conversely, if the TPP and THL test procedures were modified to include the invention in the test (i.e. with spacers) it is not certain that the garment incorporating this invention could simultaneously meet the TPP and THL requirements of NFPA 1971.

U.S. Pat. No. 3,710,395A discloses an air distribution garment consisting of a layer of an air-permeable, stretchable, compression-resistant, spacer fabric enclosed between layers of stretchable, air-permeable, fabric, having air inlet openings on said garment communicating with manifolds within the garment and through which air is caused to flow over the back and chest portions through the spacer fabric. The object of this invention is to remove excess heat and moisture from the torso to maintain the body in thermal balance. However, the description of the preferred embodiments reveals that the invention is intended to be worn underneath a regular or special-purpose garment and is not intended as a protective garment itself. If it were, the NFPA 1971 performance requirements mandating a level of impermeability to water and to blood-borne pathogens (and as a consequence to air) would render non-compliant with said standard, any firefighter garment incorporating said invention.

U.S. Pat. No. 5,572,991A discloses a firefighter's garment in which in a preferred embodiment the exhaled air from the firefighter's SCBA (Self-Contained Breathing Apparatus) is delivered to the air space or channels between adjacent layers of the garment. The object of the invention is to cool the garment and lower the heat stress on the firefighter. However, to be effective the firefighter must, a priori, be wearing and using his SCBA, a situation that exists, if at all, for a small percentage of the time that a firefighter is wearing his protective garment. Furthermore, because the channels are between adjacent layers of the protective garment the innermost layer, i.e. the thermal barrier, is in direct contact with the garment or skin of the firefighter.

U.S. Pat. No. 5,924,134A discloses a protective garment including an outer shell, a thermal liner and a moisture barrier, in which the thermal liner includes a flame and heat-resistant, apertured, closed-cell foam laminate. The object of the invention is to have a thermal liner that is essentially non-moisture absorbent and that provides high thermal insulation. However, in this invention the thermal barrier of apertured, closed-cell foam is, first, located between the outer shell and the moisture barrier, and second, is a continuous and complete layer rather than a series of discrete, individual elements or spacers. It is nowhere an object of this invention to improve air flow between protective garment and firefighter.

However, in light of the aforementioned, there is still a need for a firefighter garment which, by virtue of its design and components, would be able to provide better air circulation between the garment and the wearer thereof.

SUMMARY OF THE INVENTION

The present invention relates to a firefighter garment comprising but not limited to an outer shell, a moisture barrier and a thermal barrier wherein spacer elements are attached to the innermost surface of the garment such that air can circulate between the firefighter garment and the wearer thereof.

It is a further object of the present invention to facilitate evaporative cooling and thereby enhance firefighter comfort.

In accordance with a preferred embodiment, the spacer elements are placed on those areas of the garment opposite the areas of the human body having the highest rates of perspiration and metabolic heat transfer.

The components, advantages and other features of the invention will become more apparent upon reading of the following non-restrictive description of some optional configurations, given for the purpose of exemplification only, with reference to the accompanying figures.

FIGS. **12*a* and 12*b*** are side and perspective views respectively of a firefighter garment according to another embodiment of the present invention.

Figure 13:
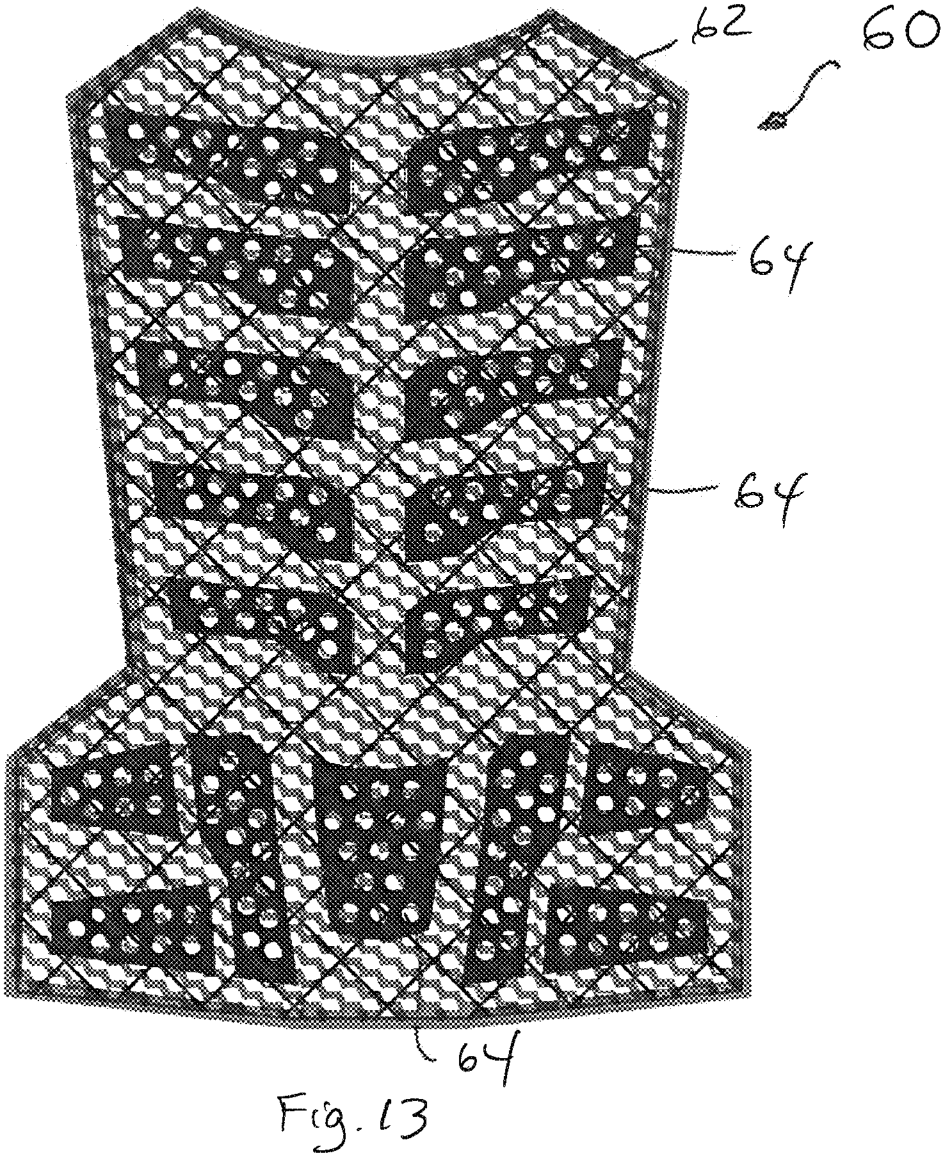

FIG. 13 is a front view of a spacer assembly in accordance with another embodiment of the present invention.

DESCRIPTION OF PREFERRED EMBODIMENTS

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present invention illustrated in other figures can be easily inferred therefrom. The embodiments, geometrical configurations, materials mentioned and/or dimensions shown in the figures are optional, and are given for exemplification purposes only.

Furthermore, although the present invention may be used with various objects, such as firefighter garments, for example, it is understood that it may be used with other types of garments or articles of clothing. For this reason, expressions such as "garments", etc. as used herein should not be taken as to limit the scope of the present invention to these garments in particular. These expressions encompass all other kinds of materials, objects and/or purposes with which the present invention could be used and may be useful, as can be easily understood.

Figure 1:
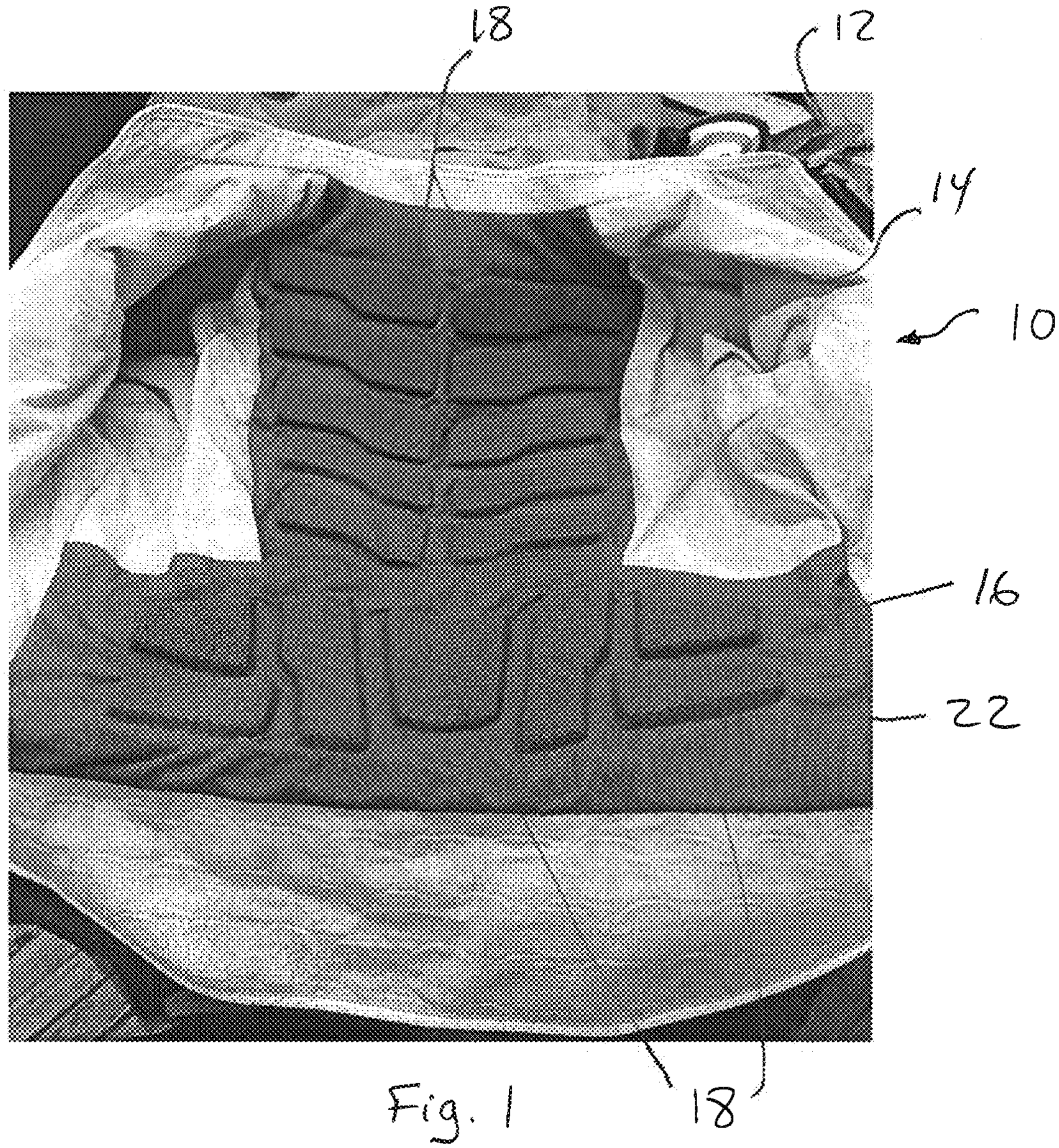
FIG. 1 is a front perspective view of a firefighter garment according to an embodiment of the present invention.
Figure 2:
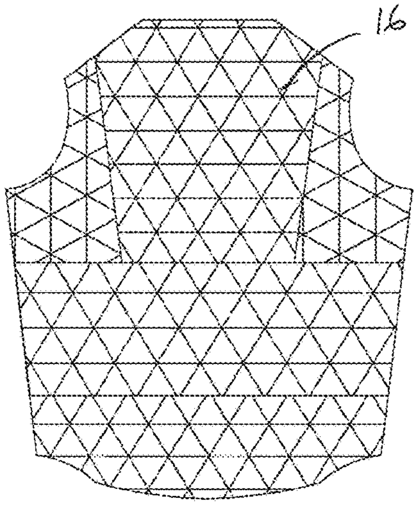
Fig. 2 (PRIOR ART)
FIG. 2 is a front schematic view of a liner of a prior art garment.

As shown in FIG. 1, there is provided a firefighter garment 10 including an outer shell 12, a moisture barrier 14, and a thermal barrier 16. Spacer elements 18 are affixed to an innermost layer of the garment, such as a side of the thermal barrier 16, closest to a body of the firefighter. FIG. 1 illustrates an example of a ventilated back of a garment, where a plurality of spacer elements 18, made of closed cell foam attached to a thermal barrier 16 or liner, are covered with a mesh 22. The spacer elements are positioned and shaped to create a series of channels where air and evaporated perspiration can flow.

Figure 3:
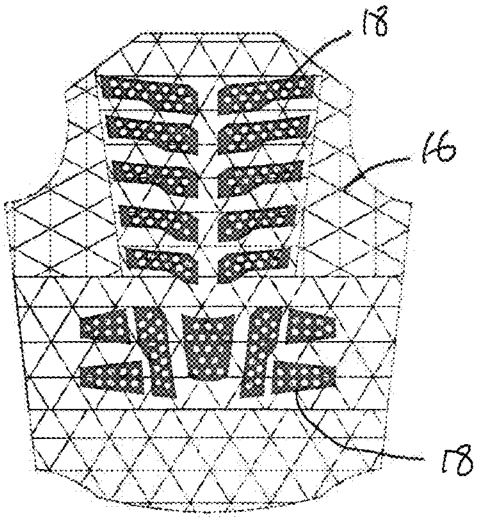
FIG. 3 is a front schematic view of a liner with spacer elements installed thereon according to an embodiment of the present invention.
Figure 4:
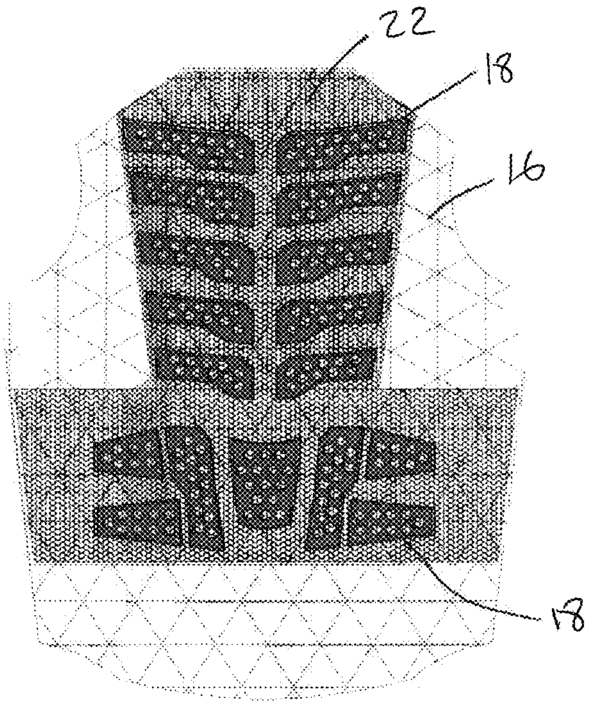
FIG. 4 is a front schematic view of the liner of FIG. 3 with a mesh installed thereon.

FIG. 3 illustrates a regular garment thermal barrier 16 or liner. FIG. 4 shows an example where spacer elements 18 are installed on the liner.

Figure 5:
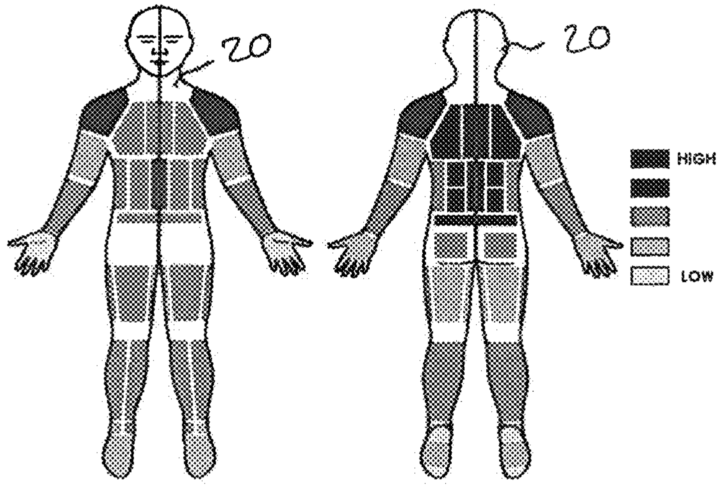
FIG. 5 is a schematic view of a body illustrating body heat loss zones due to perspiration.
Figure 6:
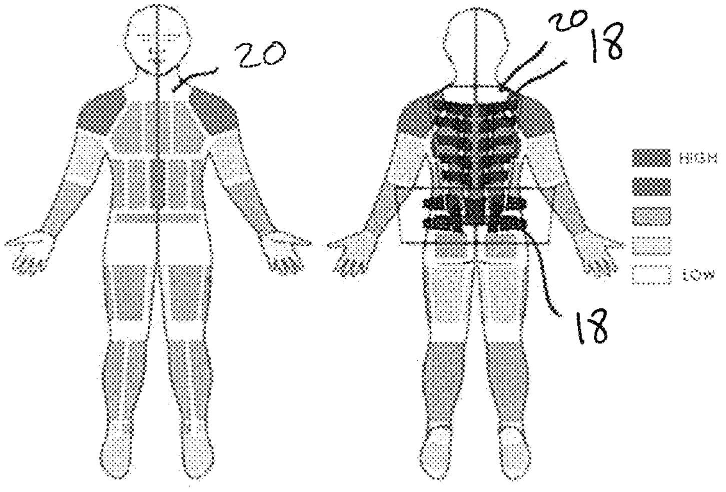
FIG. 6 is a schematic view of a body illustrating how a garment according to an embodiment of the present invention can increase heat loss in areas of the body.
Figure 7:
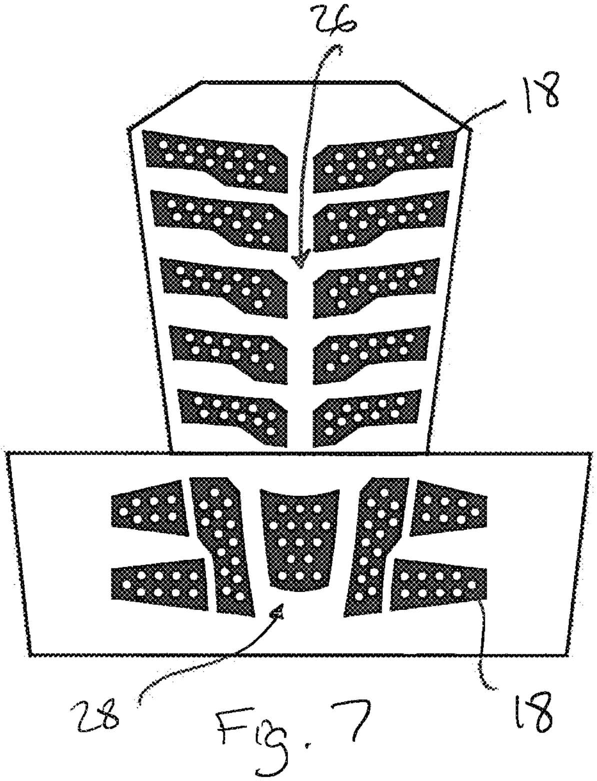
FIG. 7 is a front schematic view of a configuration of spacer elements for a garment according to an embodiment of the present invention.

In some implementations, as better shown in FIGS. 5 and 6, the spacer elements 18 are placed in locations corresponding to areas of the body 20 of high rates of perspiration and metabolic heat transfer. FIG. 5 is a schematic view of a body illustrating body heat loss zones due to perspiration. FIG. 6 thus illustrates how the garment according to the present invention, can form air channels and therefore increase the flow of heat loss from the body.

In some implementations, the spacer elements 18 are sized and positioned to form channels 26 that can protect a user's spine from the pressure of SBCA frame supports. Moreover, extra padding can be provided by positioning padding spacer elements 28 at the level of the SBCA support belt.

Figure 8:
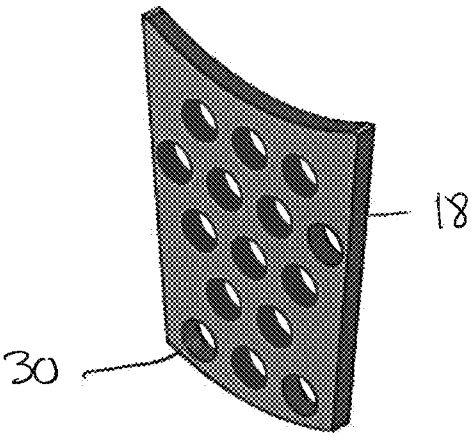
FIG. 8 is a perspective view of a spacer element according to an embodiment of the present invention.

In some implementations, as better shown in FIG. 8, the spacer elements 18 are made of perforated, closed-cell foam. In some implementations, the perforations 30 are ½" in size and help provide breathability and comfort to the user.

In some implementations, the spacer elements 18 are made of fire-resistant fabric or non-woven material.

In some implementations, the spacer elements 18 are permeable to air, water vapor and liquid water.

Figure 9:
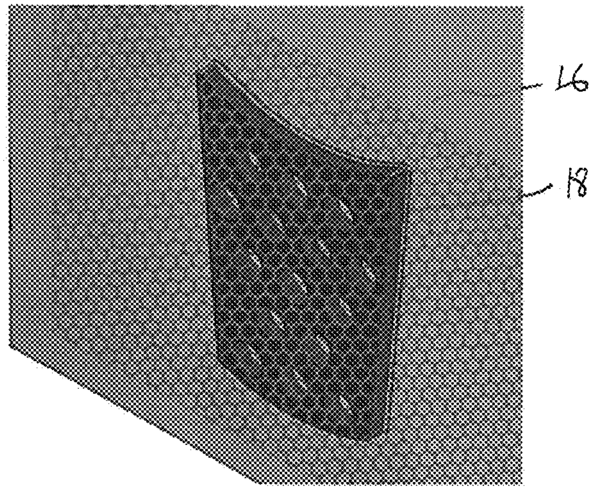
FIG. 9 is a perspective view of the spacer element shown in FIG. 8 installed on a garment in accordance with an embodiment of the present invention.
Figure 10:
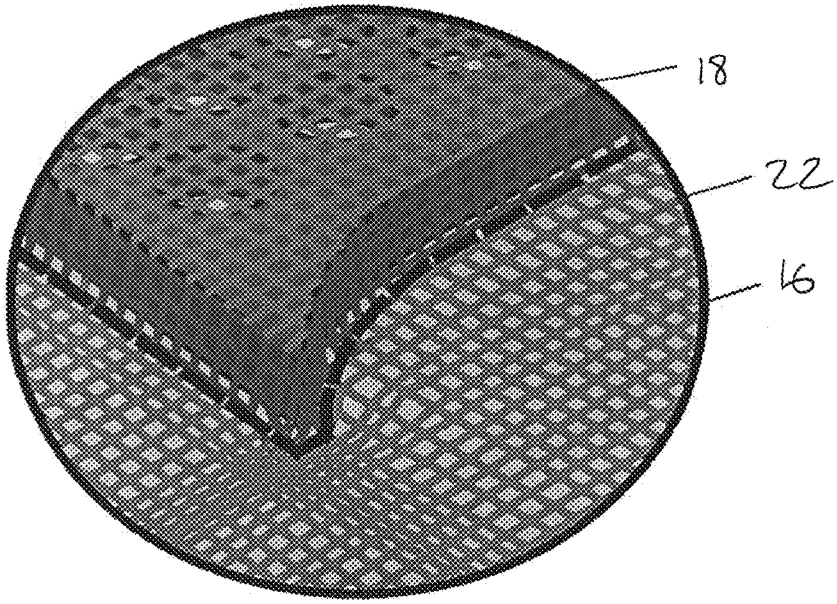
FIG. 10 is a detailed view of the spacer element shown in FIG. 9.

In some implementations, as better shown in FIGS. 9 and 10, the spacer elements 18 are sewn to the thermal barrier 16, preferably to the facecloth of the thermal barrier 16.

In some implementations, the spacer elements 18 are covered by a fire-resistant mesh fabric 22.

In some implementations, the spacer elements 18 are covered by a thin, breathable, fire-resistant fabric.

In some implementations, the spacer elements 18 meet all thermal performance requirements of a NFPA 1971 standard.

In some implementations, the spacer elements 18 are shaped and positioned such that results of THL testing as performed according to a NFPA 1971 test method are unaffected.

Figure 11:
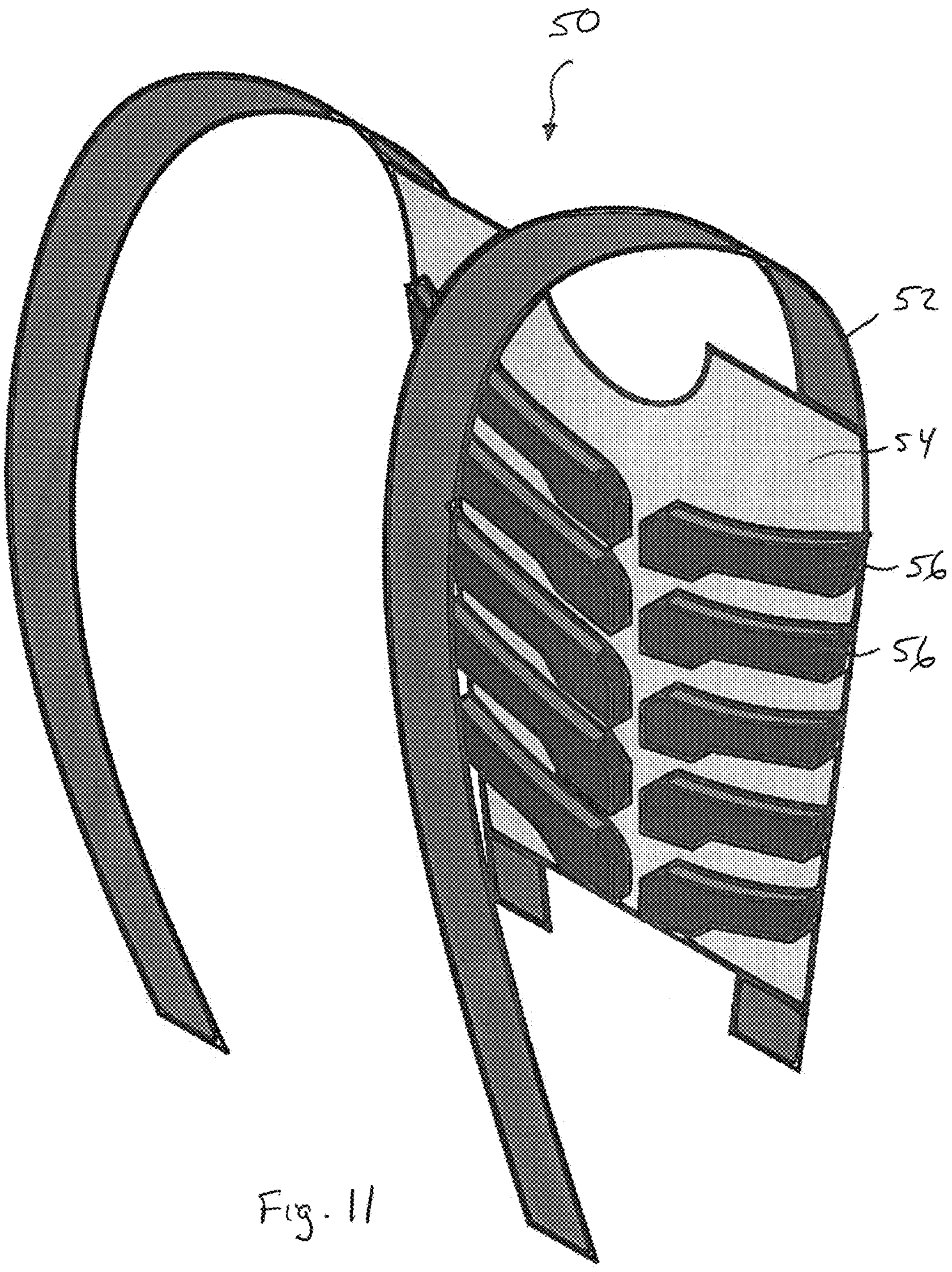
FIG. 11 is a perspective view of a firefighter garment according to another embodiment of the present invention.

According to the present invention, as better shown in FIG. 11, there is also provided a firefighter garment 50 including an inner portion 52 facing and closest to a body of a firefighter, and a spacer assembly 54 supporting a plurality of spaced-apart spacer elements 56. The spacer assembly 54 is affixable to the inner portion 52 to the garment 50. Once again, the spacer elements 56 can be positioned to form air channels and therefore increase the flow of heat loss from the body.

In some implementations, as shown in FIG. 11, the garment 50 comprises suspenders.

In some implementations, the spacer assembly 54 is removably affixable to the inner layer of the garment, in order to facilitate replacement or cleaning thereof.

In other implementations, the spacer assembly 54 is integrated to the suspenders.

Figure 12A:
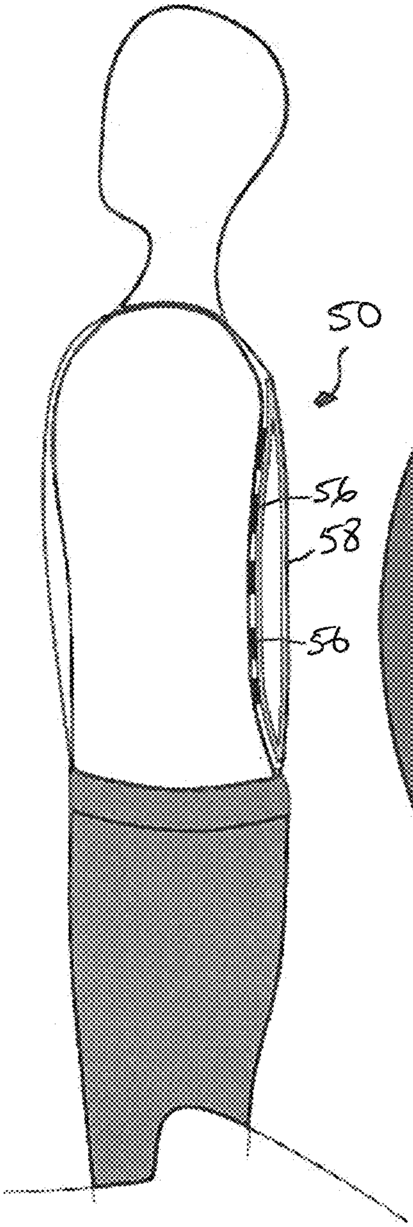
Figure 12B:
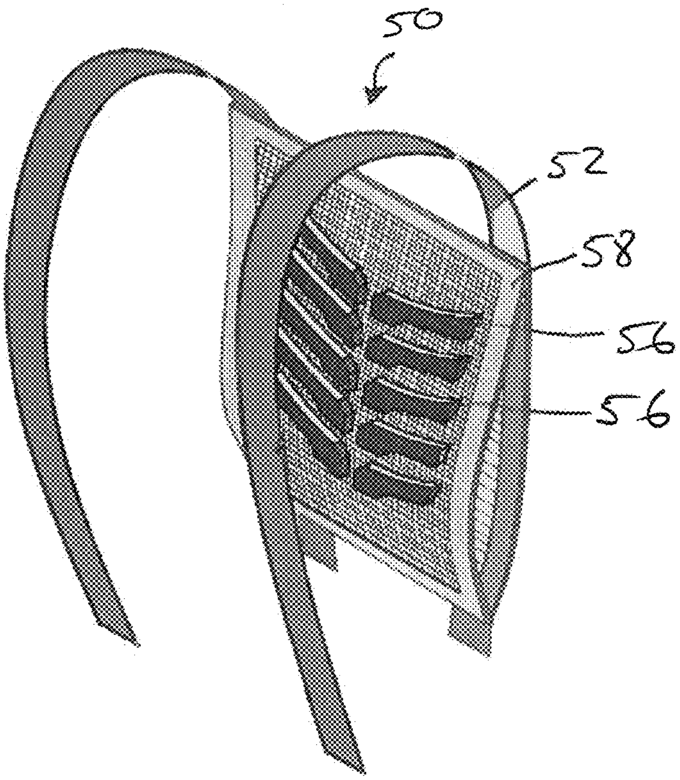

In some implementations, as better shown in FIGS. 12*a* and 12*b*, the spacer assembly 54 comprises a rigid frame assembly 58 forming an empty shell.

Therefore, in addition to forming air channels through the spacer elements 56, the spacer assembly, through the rigid frame, creates a zone of "dead air" that improves thermal protection. The rigid frame can further be formed as netting.

According to the present invention, as better seen in FIG. 13, there is also provided a spacer assembly 60 comprising a support assembly 62 and a plurality of spacer elements 64 affixed to the support assembly 62. The support assembly 62 is attachable to a firefighter garment. This spacer assembly 60 can thus be provided as a kit to be retrofitted, integrated or attached to a firefighter garment to provide the above-described advantages. The spacer assembly can include the above-described features of the spacer elements, and can be covered with a mesh. For example, the spacer assembly 60 as a kit can be affixed to the inner layer of a garment or to suspenders.

Of course, numerous modifications could be made to the above-described embodiments without departing from the scope of the invention, as defined in the appended claims.

The invention claimed is:

1. A firefighter protective coat comprising:
- a plurality of superimposed layers, the plurality of superimposed layers comprising:
- an outer shell defining an outermost layer of the firefighter protective coat;
- a moisture barrier inwardly affixed to the outer shell; and
- a thermal barrier inwardly affixed to the moisture barrier, the thermal barrier defining an innermost layer of the plurality of superimposed layers; and
- an array of spacer pads inwardly affixed to the thermal barrier, the array of spacer pads being configured to maintain a gap between the thermal barrier and a firefighter's body when the firefighter protective coat is worn by the firefighter.

2. The firefighter protective coat of claim 1, wherein the array of spacer pads is distributed into first and second neighboring columns in a back region of the firefighter's body.

3. The firefighter protective coat of claim 2, wherein the first and second neighboring columns each comprises five spacer pads.

4. The firefighter protective coat of claim 1, wherein the array of spacer pads is distributed into first, second and third neighboring groups in a waist region of the firefighter's body.

5. The firefighter protective coat of claim 4, wherein:
- the first neighboring group comprises three spacer pads positioned in a right section of the waist region;
- the second neighboring group comprises one spacer pad positioned in a central section of the waist region; and
- the third neighboring group comprises three spacer pads positioned in a left section of the waist region.

6. The firefighter protective coat of claim 1, wherein the array of spacer pads is permeable to air, water vapor and liquid water.

7. The firefighter protective coat of claim 1, wherein each spacer pad is made of closed cell foam.

8. The firefighter protective coat of claim 7, wherein the closed cell foam of said spacer pads comprises perforations therein.

9. The firefighter protective coat of claim 8, wherein said perforations have a diameter of about 0.5 inch.

10. The firefighter protective coat of claim 1, wherein the array of spacer pads comprises a fire-resistant mesh fabric covering said spacer pads.

11. The firefighter protective coat of claim 1, wherein the array of spacer pads partially covers an inner surface of the thermal barrier.

12. The firefighter protective coat of claim 1, wherein the gap is aligned with areas of high rates of perspiration and metabolic heat transfer of a firefighter's body.

13. The firefighter coat of claim 1, wherein each spacer pad meets performance requirements of a NFPA 1971 standard.

14. A firefighter protective coat comprising:
- a plurality of superimposed layers, the plurality of superimposed layers comprising:
- an outer shell defining an outermost layer of the firefighter protective coat;
- a moisture barrier inwardly affixed to the outer shell;
- a thermal barrier inwardly affixed to the moisture barrier, the thermal barrier defining an innermost layer of the plurality of superimposed layers; and an array of spacer pads inwardly affixed to the thermal barrier; and a network of air circulation channels separating neighboring spacer pads from one another.

15. The firefighter protective coat of claim 14, wherein the network of air circulation channels comprises:

a main central channel extending along a spine of the firefighter's body; and a plurality of auxiliary channels, each one of the plurality of auxiliary channels being in fluid communication with the main central channel.

16. The firefighter protective coat of claim 14, wherein the array of spacer pads is configured to maintain a gap between the thermal barrier and a firefighter's body when the firefighter protective coat is worn by the firefighter.

17. The firefighter protective coat of claim 14, wherein the array of spacer pads is distributed into first and second neighboring columns in a back region of the firefighter's body.

18. The firefighter protective coat of claim 17, wherein the first and second neighboring columns each comprises five spacer pads.

19. The firefighter protective coat of claim 14, wherein the array of spacer pads is distributed into first, second and third neighboring groups in a waist region of the firefighter's body.

20. The firefighter protective coat of claim 19, wherein:

the first neighboring group comprises three spacer pads positioned in a right section of the waist region;

the second neighboring group comprises one spacer pad positioned in a central section of the waist region; and the third neighboring group comprises three spacer pads positioned in a left section of the waist region.

21. The firefighter protective coat of claim 14, wherein the array of spacer pads is permeable to air, water vapor and liquid water.

22. The firefighter protective coat of claim 14, wherein each spacer pad is made of closed cell foam.

23. The firefighter protective coat of claim 22, wherein the closed cell foam of said spacer pads comprises perforations therein.

24. The firefighter protective coat of claim 23, wherein said perforations have a diameter of about 0.5 inch.

25. The firefighter protective coat of claim 14, wherein the array of spacer pads comprises a fire-resistant mesh fabric covering said spacer pads.

26. The firefighter protective coat of claim 14, wherein the array of spacer pads partially covers an inner surface of the thermal barrier.

27. The firefighter protective coat of claim 14, wherein the gap is aligned with areas of high rates of perspiration and metabolic heat transfer of a firefighter's body.

28. The firefighter coat of claim 14, wherein each spacer pad meets performance requirements of a NFPA 1971 standard.

29. A firefighter protective coat comprising:

a plurality of superimposed layers, the plurality of superimposed layers comprising:

an outer shell defining an outermost layer of the firefighter protective coat;

a moisture barrier inwardly affixed to the outer shell; and a thermal barrier inwardly affixed to the moisture barrier, the thermal barrier defining an innermost layer of the plurality of superimposed layers; and an array of spacer pads inwardly affixed to the thermal barrier, each spacer pad of said array being made of closed cell foam, the spacer pads being covered by a fire-resistant mesh fabric.

30. The firefighter protective coat of claim 29, wherein the closed cell foam of said spacer pads comprises perforations therein.

31. The firefighter protective coat of claim 30, wherein said perforations have a diameter of about 0.5 inch.

32. The firefighter protective coat of claim 29, wherein the array of spacer pads is distributed into first and second neighboring columns in a back region of the firefighter's body.

33. The firefighter protective coat of claim 32, wherein the first and second neighboring columns each comprises five spacer pads.

34. The firefighter protective coat of claim 29, wherein the array of spacer pads is distributed into first, second and third neighboring groups in a waist region of the firefighter's body.

35. The firefighter protective coat of claim 34, wherein:

the first neighboring group comprises three spacer pads positioned in a right section of the waist region;

the second neighboring group comprises one spacer pad positioned in a central section of the waist region; and the third neighboring group comprises three spacer pads positioned in a left section of the waist region.

36. A firefighter apparel comprising:

a firefighter protective coat comprising:

a plurality of superimposed layers, the plurality of superimposed layers comprising:

an outer shell defining an outermost layer of the firefighter protective coat;

a moisture barrier inwardly affixed to the outer shell; and a thermal barrier inwardly affixed to the moisture barrier, the thermal barrier defining an innermost layer of the plurality of superimposed layers, suspenders having a back portion;

a support frame affixed to the suspenders, the support frame extending in the back portion of the suspenders; and an array of spacer pads inwardly affixed to the support frame, the array of spacer pads being configured to maintain a gap between the support frame and a firefighter's body when the firefighter garment is worn by the firefighter.

37. The firefighter apparel of claim 36, further comprising a network of air circulation channels separating neighboring spacer pads from one another and being configured to allow air circulation therein.

38. The firefighter apparel of claim 37, wherein the network of air circulation channels comprises:

a main central channel extending along a spine of the firefighter's body; and a plurality of auxiliary channels, each one of the plurality of auxiliary channels being in fluid communication with the main central channel.

39. The firefighter apparel of claim 36, wherein the array of spacer pads is distributed into first and second neighboring columns in a back region of the firefighter's body.

40. The firefighter apparel of claim 37, wherein the first and second neighboring columns each comprises five spacer pads.

41. The firefighter apparel of claim 36, wherein the array of spacer pads is distributed into first, second and third neighboring groups in a waist region of the firefighter's body.

42. The firefighter apparel of claim 41, wherein:

the first neighboring group comprises three spacer pads positioned in a right section of the waist region;

the second neighboring group comprises one spacer pad positioned in a central section of the waist region; and the third neighboring group comprises three spacer pads positioned in a left section of the waist region.

43. The firefighter apparel of claim 36, wherein the array of spacer pads is permeable to air, water vapor and liquid water.

44. The firefighter apparel of claim 36, wherein each spacer pad is made of closed cell foam.

45. The firefighter apparel of claim 44, wherein the closed cell foam of said spacer pads comprises perforations therein.

46. The firefighter apparel of claim 45, wherein said perforations have a diameter of about 0.5 inch.

47. The firefighter apparel of claim 36, wherein the array of spacer pads comprises a fire-resistant mesh fabric covering said spacer pads.

48. The firefighter apparel of claim 36, wherein the array of spacer pads partially covers an inner surface of the thermal barrier.

49. The firefighter apparel of claim 36, wherein the gap is aligned with areas of high rates of perspiration and metabolic heat transfer of a firefighter's body.

50. The firefighter apparel of claim 36, wherein each spacer pad meets performance requirements of a NFPA 1971 standard.

51. A firefighter apparel comprising a firefighter protective coat, the firefighter protective coat comprising a plurality of superimposed layers, the plurality of superimposed layers comprising an outer shell defining an outermost layer of the firefighter protective coat, a moisture barrier inwardly affixed to the outer shell, and a thermal barrier inwardly affixed to the moisture barrier, the thermal barrier defining an innermost layer of the plurality of superimposed layers, the firefighter apparel comprising:

suspenders having a back portion;

a support frame affixed to the suspenders, the support frame extending in the back portion of the suspenders; and an array of spacer pads inwardly affixed to the support frame, the array of spacer pads being configured maintain a gap between the support frame and a firefighter's body when the firefighter garment is worn by the firefighter.

52. The firefighter apparel of claim 51, further comprising a network of air circulation channels separating neighboring spacer pads from one another and being configured to allow air circulation therein.

53. The firefighter apparel of claim 52, wherein the network of air circulation channels comprises:

a main central channel extending along a spine of the firefighter's body; and a plurality of auxiliary channels, each one of the plurality of auxiliary channels being in fluid communication with the main central channel.

54. The firefighter apparel of claim 51, wherein the array of spacer pads is distributed into first and second neighboring columns in a back region of the firefighter's body.

55. The firefighter apparel of claim 54, wherein the first and second neighboring columns each comprises five spacer pads.

56. The firefighter apparel of claim 51, wherein the array of spacer pads is distributed into first, second and third neighboring groups in a waist region of the firefighter's body.

57. The firefighter apparel of claim 56, wherein:

the first neighboring group comprises three spacer pads positioned in a right section of the waist region;

the second neighboring group comprises one spacer pad positioned in a central section of the waist region; and the third neighboring group comprises three spacer pads positioned in a left section of the waist region.

58. The firefighter apparel of claim 51, wherein the array of spacer pads is permeable to air, water vapor and liquid water.

59. The firefighter apparel of claim 51, wherein each spacer pad is made of closed cell foam.

60. The firefighter apparel of claim 59, wherein the closed cell foam of said spacer pads comprises perforations therein.

61. The firefighter apparel of claim 60, wherein said perforations have a diameter of about 0.5 inch.

62. The firefighter apparel of claim 51, wherein the array of spacer pads comprises a fire-resistant mesh fabric covering said spacer pads.

63. The firefighter apparel of claim 53, wherein the array of spacer pads partially covers an inner surface of the thermal barrier.

64. The firefighter apparel of claim 53, wherein the gap is aligned with areas of high rates of perspiration and metabolic heat transfer of a firefighter's body.

65. The firefighter apparel 53, wherein each spacer pad meets performance requirements of a NFPA 1971 standard.

* * * * *